United States Patent
Conlee et al.

[19]

[11] Patent Number: 5,924,199
[45] Date of Patent: Jul. 20, 1999

[54] STEERING WHEEL INSERT

[75] Inventors: James Kent Conlee, Dayton; Brian Thomas Finnigan, Lewisburg, both of Ohio

[73] Assignee: General Motors Corporation, Detroit, Mich.

[21] Appl. No.: 08/641,371

[22] Filed: Apr. 30, 1996

[51] Int. Cl.⁶ .................................................. B21C 23/00
[52] U.S. Cl. ........................... 29/894.1; 29/417; 72/256; 264/291; 264/292; 264/296
[58] Field of Search ......................... 29/417, 897, 897.2, 29/894.1, 8; 72/377, 378, 256; 264/291, 292, 296, 145, 157

[56] References Cited

U.S. PATENT DOCUMENTS

| | | | |
|---|---|---|---|
| 1,604,272 | 10/1926 | Gammeter | 29/894.1 X |
| 1,610,383 | 12/1926 | Johnson | 72/378 X |
| 1,721,664 | 7/1929 | Husted | 29/894.1 |
| 1,785,897 | 12/1930 | Geyer | 29/894.1 X |
| 1,869,267 | 7/1932 | Marbach et al. | 29/894.1 |
| 1,915,769 | 6/1933 | Thomas | 29/894.1 X |
| 2,600,163 | 6/1952 | Henry | 29/8 |
| 2,623,423 | 12/1952 | Horvath | 29/8 X |
| 3,508,427 | 4/1970 | Broderick | 29/417 X |
| 3,848,310 | 11/1974 | Steinback | 29/417 X |
| 4,030,179 | 6/1977 | Schwarz | 29/417 X |
| 4,394,342 | 7/1983 | Mercer | 264/292 |
| 5,365,650 | 11/1994 | Smith et al. | 29/417 |
| 5,470,099 | 11/1995 | Williams . | |

FOREIGN PATENT DOCUMENTS

| | | | |
|---|---|---|---|
| 5-329530 | 12/1993 | Japan | 72/256 |
| 2027620 | 2/1980 | United Kingdom | 29/417 |

*Primary Examiner*—Joseph M. Gorski
*Attorney, Agent, or Firm*—Kathryn A. Marra

[57] ABSTRACT

A method of making a one-piece steering wheel insert includes the steps of extruding material into an elongated continuous extrusion having a shape including an outer rim portion, a central hub portion and at least one spoke portion extending between the hub portion and the rim portion, cutting the extrusion into a plurality of blanks, and forming each of the blanks into a final shape of the steering wheel insert.

6 Claims, 4 Drawing Sheets

STEERING WHEEL INSERT

This invention relates to a steering wheel for use in a vehicle, and more particularly to a method of making a one-piece steering wheel insert.

BACKGROUND OF THE INVENTION

It is known in the prior art to provide a steering wheel for use in a motor vehicle. A steering wheel typically includes a central hub portion, an outer circular rim portion and a plurality of spokes extending between and connecting the hub portion and the rim portion. It is also known in the prior art that the hub portion may serve as a receiving area for an air bag module or a decorative trim piece with a horn which is mounted on the hub portion.

Preferably, the steering wheel includes a steering wheel insert made of a strong, sturdy material, such as metal. The steering wheel insert is typically covered by a covering material, such as foam or other elastomeric or plastic materials, which is aesthetically pleasing in look and feel to a driver. It is known in the prior art to make the steering wheel insert out of several pieces which are fastened, welded, or otherwise joined together.

It is also known in the prior art to make the steering wheel insert as a single die cast component, preferably of strong, lightweight materials such as aluminum or magnesium. Die casting reduces the number of components which must be assembled and manufactured. However, the die casting of each individual steering wheel insert can be time consuming and limits the available materials and material properties which can be used to make the steering wheel inserts. In addition, the die casting tools are relatively expensive and have relatively short life cycles, requiring replacement tools.

SUMMARY OF THE INVENTION

This invention provides an improved method of making a one-piece steering wheel insert which advantageously is lightweight and has continuous structural integrity. Advantageously, initial tooling costs and replacement costs of tools can preferably be reduced over prior art die casting by using this improved method of making a steering wheel insert while still providing a one-piece steering wheel insert without welding or fastening. This improved method of making the steering wheel insert preferably enables a varied selection of materials and material properties that can be used for the steering wheel insert as compared to using die casting.

These advantages are accomplished in the present invention for a method of making a one-piece steering wheel insert by the steps of extruding material into an elongated continuous extrusion having a shape including an outer rim portion, a central hub portion and at least one spoke portion extending between the hub portion and the rim portion, cutting the extrusion into a plurality of blanks, and forming each of the blanks into a final shape of the steering wheel insert. The step of forming each of the blanks into the final shape of the steering wheel insert preferably includes axially deforming the blank such that the hub portion becomes axially offset from the rim portion and preferably includes radially deforming the blank such that the rim portion has a final perimeter sized greater than a final perimeter of the blank.

In accordance with other preferred aspects of the invention, the extrusion is preferably a cylinder, the extrusion is preferably radially cut into planar blanks, and the steering wheel insert is preferably deformed to a non-planar shape. Also preferably, the step of forming each of the blanks into the final shape of the steering wheel insert bincludes placing each blank on a conical-shaped die portion including an outwardly ramped portion and pressing the blank in an axial direction against the die portion such that the rim portion rides along the ramped portion and is circumferentially and radially stretched to a final rim diameter greater than a diameter of the blank and such that the hub portion becomes axially offset from the rim portion.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1A:
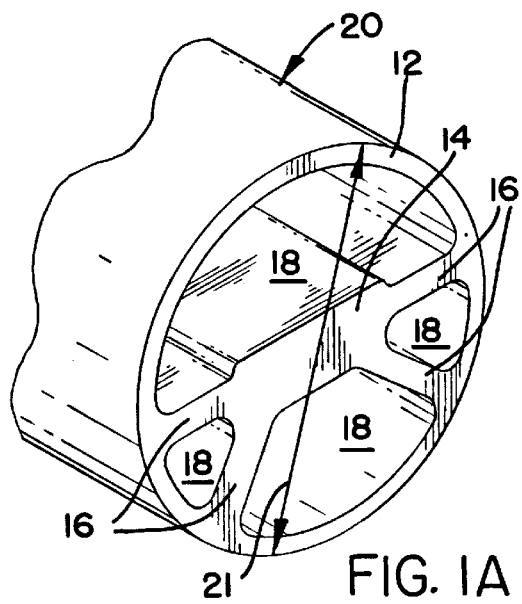
FIGS. 1A–1D show perspective views illustrating the steps for making a steering wheel insert and showing an extrusion in FIG. 1A, a blank in FIG. 1C, and a steering wheel insert in a final shape in FIG. 1D.
Figure 1B:
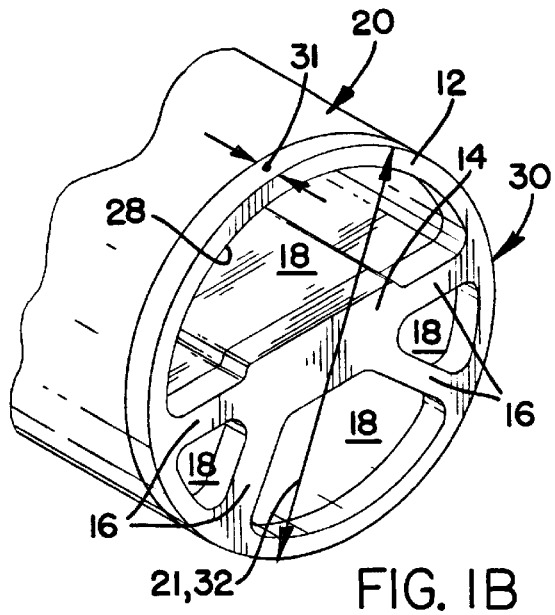
Figure 1C:
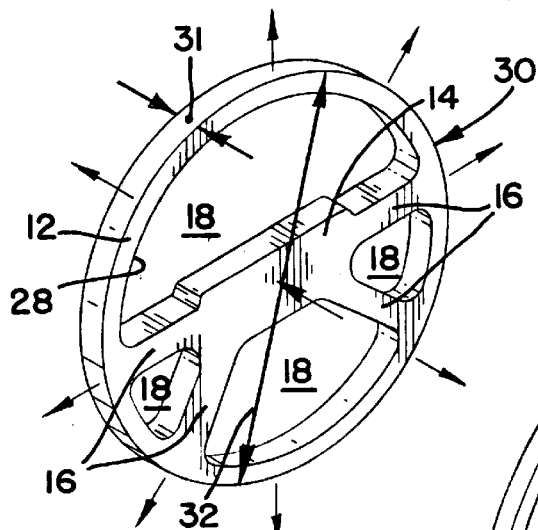
Figure 1D:
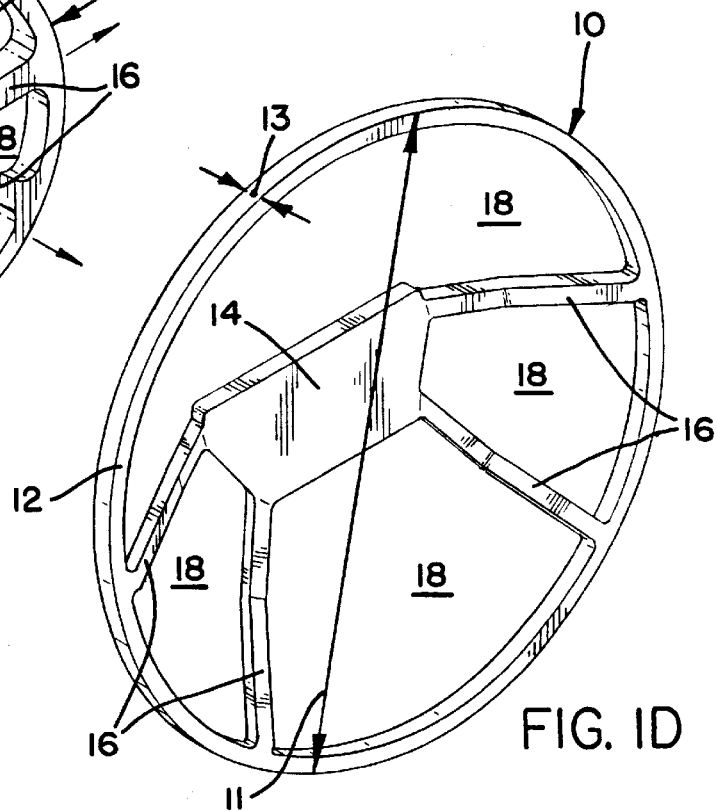

Referring to FIG. 1D, a steering wheel insert 10 includes an outer circular rim portion 12, a central hub portion 14, and a plurality of spoke portions 16 extending between and connecting the hub portion 14 and the rim portion 12. Empty spaces 18 are located between the spoke portions 16. The steering wheel insert 10 is typically covered by a covering material (not shown), such as foam or other elastomeric or plastic materials, which is aesthetically pleasing in look and feel to a driver. The steering wheel insert 10 preferably serves as the underlying structural support of a complete steering wheel assembly (not shown). The steering wheel insert 10 made according to the method of the present invention is one-piece and is preferably made of a lightweight, yet strong material, such as aluminum, magnesium, other metal alloys, or thermoplastic materials. It will be appreciated that the steering wheel insert 10 could also serve as the complete steering wheel without the outer covering material to reduce costs, especially if the steering wheel insert 10 is made in accordance with the present invention using thermoplastic material. The steering wheel insert 10 preferably has a final rim diameter 11 of about 12 inches to about 15 inches.

Referring to FIG. 1A, the first step in making a steering wheel insert 10 is to provide a plurality of billets (not shown), such as aluminum billets, and preferably preheating the billets for softening. The billets are then pressed through an extrusion die having a shape to form an axially elongated continuous extrusion 20, which is preferably a cylinder as shown in FIG. 1A. The extrusion 20 has a shape including the outer rim portion 12, the central hub portion 14, and the spoke portions 16 which extend between the hub portion 14 and the rim portion 12. It will be appreciated that virtually no material is wasted in the extrusion process since the extrusion die forms the extrusion 20 with the empty spaces 18 between the spoke portions 16.

Preferably, the extrusion die has a diameter of about 8 inches or less. This size is preferred since the hydraulic press for an extrusion die of eight inches or less is significantly less expensive and more readily available than for larger extrusion dies. Thus, an outer extrusion diameter 21 of the extrusion 20 is preferably about 8 inches.

The next step in making the steering wheel insert 10 is best shown with reference to FIGS. 1B and 1C. After the extrusion 20 is formed, the extrusion 20 is radially cut or sliced into circular, planar blanks 30 such as the one shown in FIG. 1C. Preferably, the extrusion 20 is softened by heating when the blanks 30 are cut. The heating may either be from the original heat of the extrusion step or from a separate heating treatment. The blanks 30 have a blank thickness 31 which is much less than a length of the extrusion 20. Preferably, the blanks 30 have a blank thickness 31 of approximately 1 inch or slightly more. The preferred blank thickness 31 will vary with the properties of the material used and the desired structural strength of the steering wheel insert 10. The blanks 30 preferably have a blank diameter 32 of about 8 inches, the same as the extrusion diameter 21.

Figure 2:
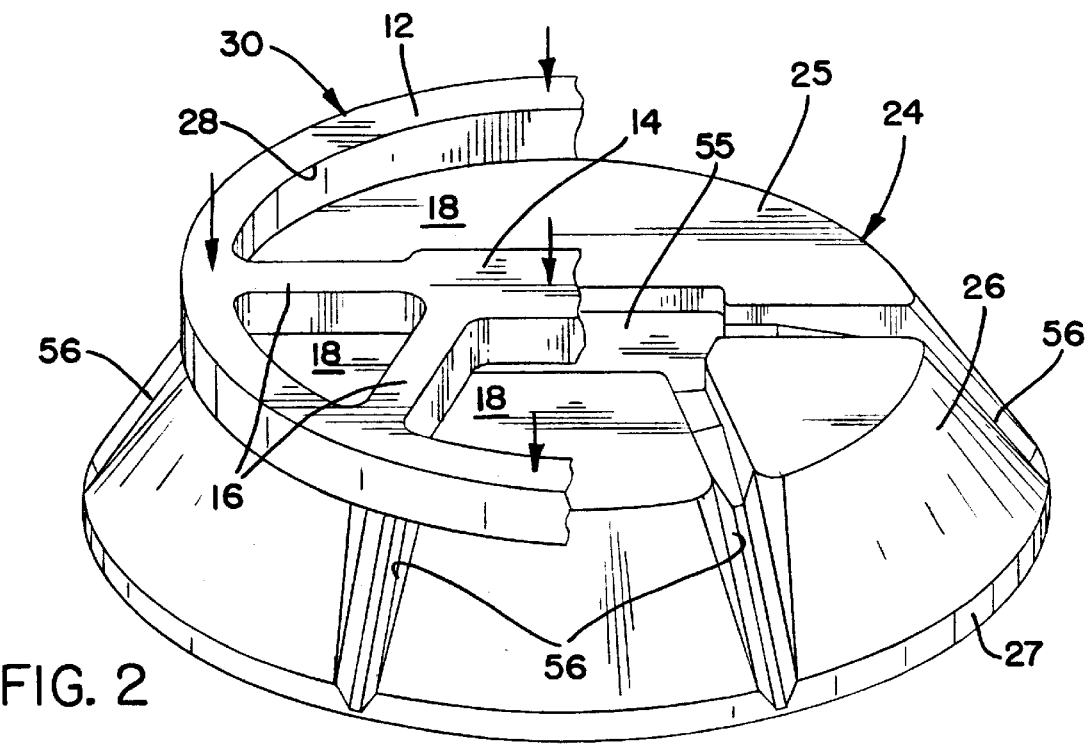
FIG. 2 further illustrates the step shown in FIG. 1C for making the steering wheel insert, including a perspective view of a lower die portion.

The final step in the making the steering wheel insert 10 is best shown with reference to FIGS. 1C, 1D and 2. The blank 30 is preferably formed into the final shape of the steering wheel insert 10, shown in FIG. 1D. Preferably, the blank 30 is simultaneously radially and axially deformed as indicated by the arrows in FIG. 1C. The blank 30 is axially deformed such that the hub portion 14 becomes axially offset from the rim portion 12 as is typically desired in the final shape of the steering wheel insert 10 so that an air bag module or other trim piece and horn can be received onto the hub portion 14. The blank 30 is radially deformed such that the rim portion 12 has a final rim diameter 11 sized greater than the blank diameter 32. Preferably, the rim portion 12 of the blank 30 is deformed to have a final rim diameter 11 of the steering wheel insert 10 of about 14 inches and a final rim thickness 13 of about 0.5 inches. The radial deformation is preferred since the extrusion die preferably has a smaller die diameter than the desired final rim diameter 11 of the steering wheel insert 10. Advantageously, the less expensive, smaller extrusion dies can be used in making steering wheel inserts 10 for significant reductions in tooling costs.

The simultaneous radial and axial deformation of the blank 30 is preferably accomplished by placing the blank 30 in a die and pressing the blank 30 to the final shape of the steering wheel insert 10, as will now be described. Referring to FIG. 2, a die preferably includes a conical-shaped lower die portion 24 having a central relatively flat upper surface 25 and a circumferential, outwardly ramped portion 26. The ramped portion 26 preferably has an outermost ramp edge 27 which has a size approximately equal to the final rim diameter 11. The blank 30 is coaxially aligned on the lower die portion 24 of the die such that an inner rim edge 28 of the blank 30 is aligned with an outer edge 29 of the upper surface 25. Thus, the die is designed with the outer edge 29 of the upper surface 25 sized approximately equal to the inner rim edge 28 of the rim portion 12 of the blank 30. Once the blank 30 is aligned, the die is closed and a mating upper die portion (not shown) axially presses the blank 30 against the lower die portion 24 such that the rim portion 12 of the blank 30 rides down along the ramped portion 26 and is circumferentially and radially stretched to the final rim diameter 11 which is greater than the blank diameter 32. At the same time, the blank 30 is axially deformed such that the hub portion 14 becomes axially offset from the rim portion 12.

Referring to FIG. 2, the lower die portion 24 has a plurality of grooves 55, 56 into which the material forming the blank 30 flows during pressing to define the final shape of the steering wheel insert 10. A central groove 55 is provided for defining the final shape of the hub portion 14 and a plurality of spoke grooves 56 are provided for defining the final shape of the spoke portions 16. It will be appreciated that the grooves 55, 56 in the lower die portion 24 may easily be altered to a variety of shapes to define a variety of final desired shapes of the steering wheel insert 10.

After being pressed in the die, the blank 30 is transformed into the final shape of the steering wheel insert 10 as shown in FIG. 1D. It will be appreciated that additions may be made to the steering wheel insert 10 after it is formed to its final shape. For example, a splined member may be pressed into or welded onto the hub portion 14 of the steering wheel insert 10 for mounting the steering wheel insert 10 to a steering column (not shown). Preferably, the hub portion 14 of the steering wheel insert 10 also serves as a receiving area for an air bag module. Thus, the hub portion 14 may include openings for receiving the splined member or for receiving fasteners for connecting the air bag module to the hub portion 14 which are either incorporated into the shape of the blank 30 as originally extruded or which are punched or drilled out after the steering wheel insert 10 is formed to its final shape. Advantageously, if the openings are included in the blank 30 as originally extruded, the splined member and other fasteners could be simultaneously pressed into the steering wheel insert 10 when the blank 30 is pressed in the die to the final shape.

Figure 3:
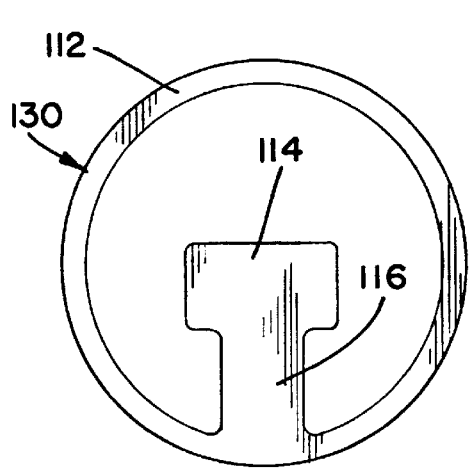
FIG. 3 shows an alternate blank.
Figure 4:
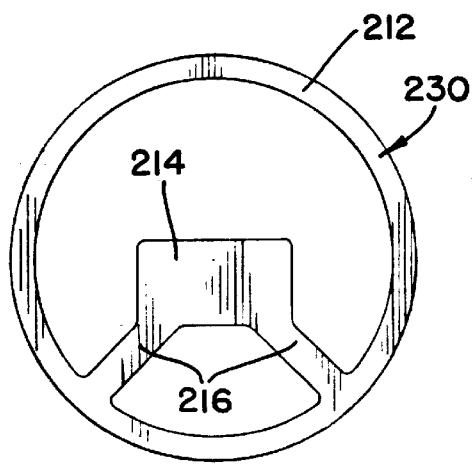
FIG. 4 shows another alternate blank.
Figure 5:
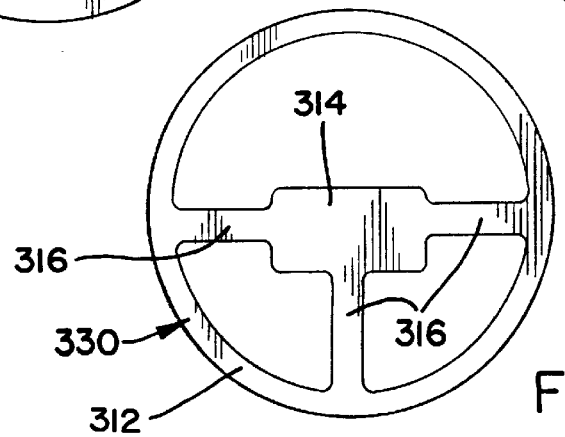
FIG. 5 shows yet another alternate blank.

It will be understood that a person skilled in the art may make modifications to the preferred embodiment shown herein within the scope and intent of the claims. While the steering wheel insert 10 is preferably shown as being circular, it will be appreciated that other geometry such as oval or rectangular could also be achieved by this method. For example, although the preferred embodiment shows four spoke portions 16, other numbers of spoke portions 16 are possible. For example, FIG. 3 shows an alternate blank 130 having an outer rim portion 112, a central hub portion 114, and a single spoke portion 116 extending between and connecting the rim portion 112 to the hub portion 114. As another example, FIG. 4 shows another alternate blank 230 having an outer rim portion 212, a central hub portion 214, and two spoke portions 216 extending between and connecting the rim portion 212 to the hub portion 214. As yet another example, FIG. 5 shows another alternate blank 330 having an outer rim portion 312, a central hub portion 314, and three spoke portions 316 extending between and connecting the rim portion 312 to the hub portion 314.

Figure 6A:
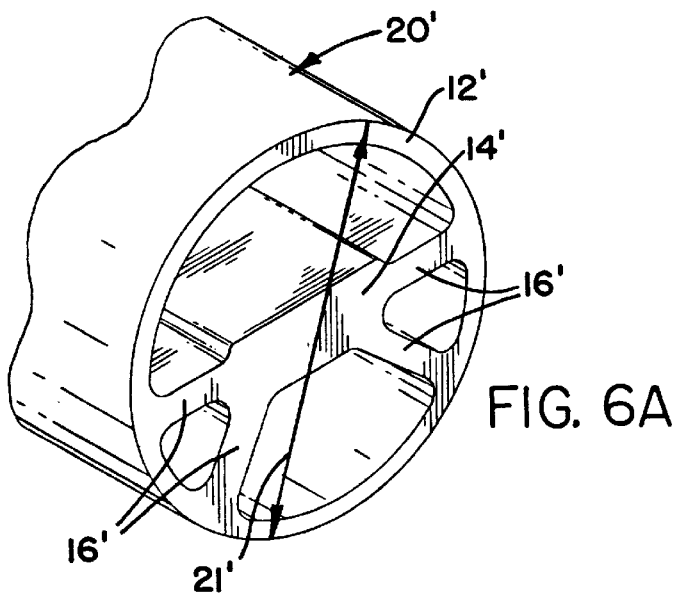
FIGS. 6A to 6E illustrate the steps for making a steering wheel insert according to an alternate embodiment of the invention.

FIGS. 6A–6E, illustrate the steps for an alternate method of making a steering wheel insert 10'. Referring to FIGS. 6A, the first step in making the steering wheel insert 10' is to press a plurality of billets (not shown) through an extrusion die having a shape to form an axially elongated continuous extrusion 20', which is preferably a cylinder as shown in FIG. 6A. The extrusion 20' has a shape including an outer rim portion 12', a central hub portion 14', and spoke portions 16' which extend between the hub portion 14' and the rim portion 12'. The extrusion 20' has an extrusion diameter 21' which is preferably about 8 inches.

Figure 6B:
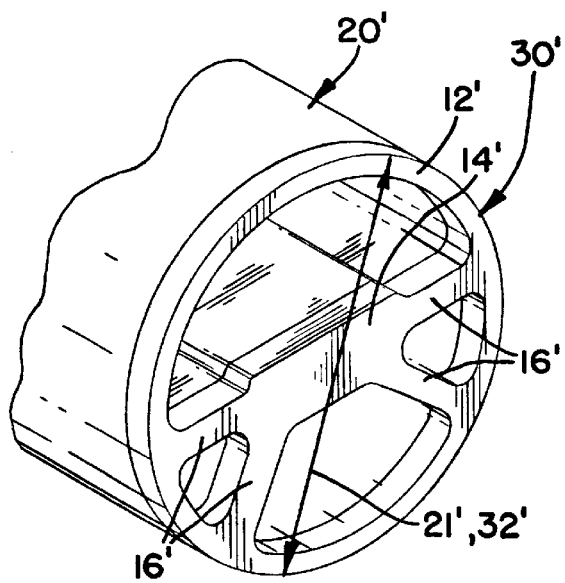
Figure 6C:
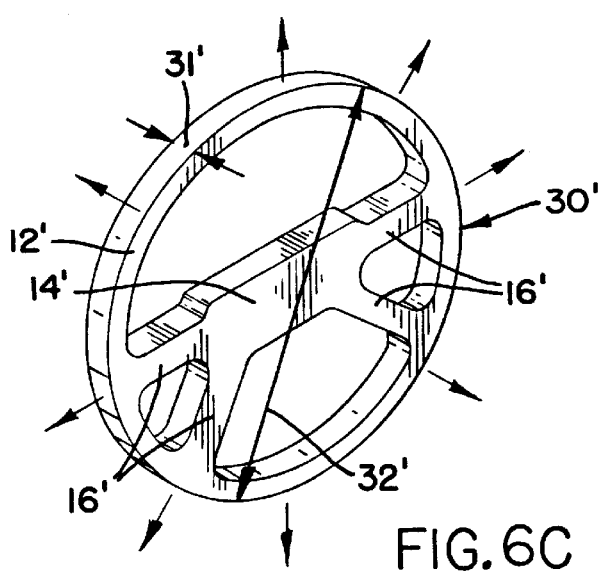

The next step in making the steering wheel insert 10' is best shown with reference to FIGS. 6B and 6C. After the extrusion 20' is formed, the extrusion 20' is radially cut or sliced into circular, planar blanks 30' such as the one shown in FIG. 6C. Preferably, the blanks 30' have a blank thickness 31' of approximately 1 inch or slightly more and a blank diameter 32' of about 8 inches.

Figure 6D:
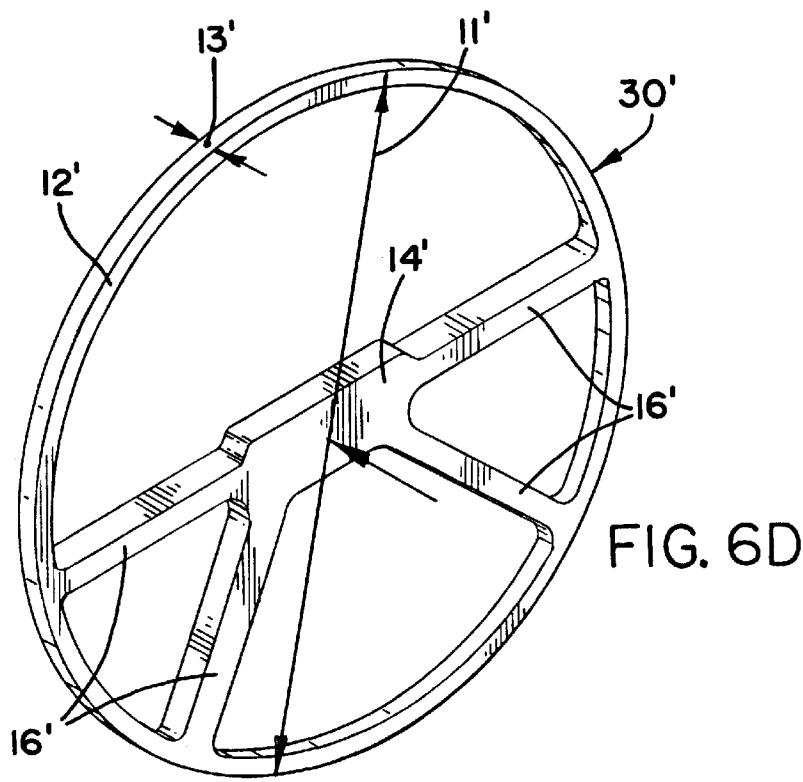

The next step in the making the steering wheel insert 10 is best shown with reference to FIGS. 6C and 6D. Preferably, the blank 30' is radially deformed as indicated by the arrows in FIG. 1C. The blank 30' is radially deformed such that the rim portion 12' has a final rim diameter 11' sized greater than the blank diameter 32'. Preferably the rim portion 12' of the blank 30' is deformed to have a final rim diameter 11' of about 14 inches and a final rim thickness 13' of about 0.5 inches. Advantageously, the less expensive, smaller extrusion press and extrusion die can be used in making the steering wheel insert 10' for significant reductions in tooling costs. The blank 30' is radially deformed to the final rim diameter 11' as shown in FIG. 6D. It will be appreciated that the blank 30' shown in FIG. 6D is still planar.

Figure 6E:
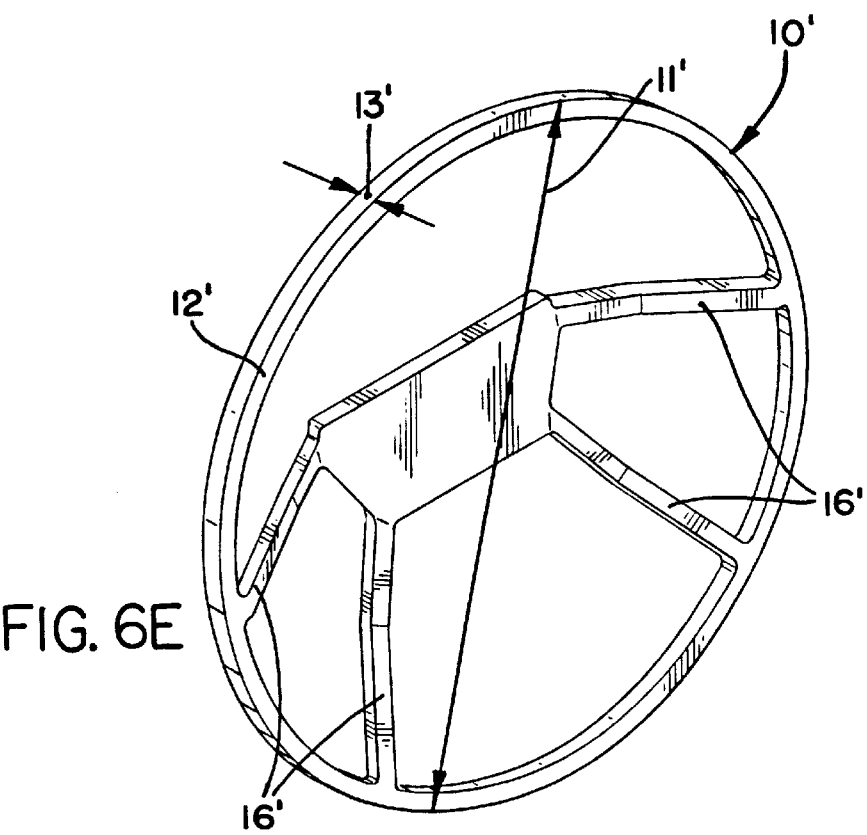

The final step in the making the steering wheel insert 10' is best shown with reference to FIGS. 6D and 6E. Preferably, the blank 30' is axially deformed by pressing such that the hub portion 14' becomes axially offset from the rim portion 12' as is typically desired in the final shape of the steering wheel insert 10' so that an air bag module or other trim piece with a horn can be received onto the hub portion 14'. The final shape of the steering wheel insert 10' is shown in FIG. 6E.

It will further be appreciated that modifications may be made to the embodiment shown in FIGS. 6A–6E. For example, the blank 30' may be axially deformed according to the arrow shown in FIG. 6D prior to being radially deformed according to the arrows shown in FIG. 6C. As another example, a larger extrusion die could be used which produces blanks having a blank diameter equivalent to the desired final rim diameter 11' of the steering wheel insert 10'. In that case, the step of radially deforming the blank 30' as shown in FIG. 6C could be eliminated from the method described with reference to FIGS. 6A–6E.

Advantageously, the present invention provides a one-piece steering wheel insert 10, 10' by using a method having the steps of making an extrusion 20, 20'cutting blanks 30, 30'and forming the blanks 30, 30' to the final shape of the steering wheel insert 10, 10'.

Advantageously, initial tooling costs and replacement costs of tools can preferably be reduced by using this method of making a steering wheel insert 10, 10' while still providing a one-piece steering wheel insert 10, 10' including the rim portion 12, 12'the hub portion 14, 14' and spoke portions 16, 16' without welding or fastening. This method offers an effective alternative to prior art die casting for making a one-piece steering wheel insert 10, 10'.

While the present embodiment has been described as carried out in a specific embodiment thereof, it is not intended to be limited thereby, but is intended to container the invention broadly within the scope and spirit of the claims.

What is claimed is:

1. A method of making a one-piece steering wheel insert, comprising the steps of:
    a) extruding material into an axially elongated continuous extrusion having an outer rim portion, a central hub portion, and at least one spoke portion connecting the central hub portion to the outer rim portion;
    b) radially cutting said extrusion into a plurality of planar blanks each having a central hub corresponding to said central hub portion, at least one spoke corresponding to said at least one spoke portion and having an initial length and an outer rim corresponding to said outer rim portion and defining an initial perimeter of the blank; and
    c) forming each of said blanks into a final shape by stretching said outer rim in a direction radially outwardly of said blank such that a final perimeter defined by the outer rim of the final shape is larger than said initial perimeter, and stretching said at least one spoke in a direction other than radially outwardly of said blank such that length of the at least one spoke of the final shape is larger than said initial length.

2. The method of claim 1, wherein the step of stretching said at least one spoke includes offsetting said central hub in a direction axially of said blank.

3. The method of claim 1, wherein the forming step includes placing said blank on a die and then pressing said blank against and along said die.

4. The method of claim 1, wherein the forming step includes the steps of:
    providing a die having an upper surface and a conical surface extending outwardly and downwardly from the upper surface.
    placing said blank on said die such that said central hub and said at least one spoke are received by said upper surface, and then
    applying a force against said blank such that said central hub and said at least one spoke is pressed against said upper surface while said outer rim is forced along and against said conical surface, whereby said outer rim and said at least one spoke are stretched while said central hub becomes axially offset.

5. The method of claim 1, wherein the forming step includes placing said blank on a die and then pressing said blank against and along said die, whereby said outer rim and said at least one spoke become simultaneously stretched while said central hub becomes axially offset.

6. A method of making a one-piece steering wheel insert, comprising the steps of:
    a) extruding material into an axially elongated continuous extrusion having an outer rim portion, a central hub portion, and at least one spoke portion connecting the central hub portion to the outer rim portion;
    b) radially cutting said extrusion into a plurality of planar blanks each having a central hub corresponding to said central hub portion, at least one spoke corresponding to said at least one spoke portion and having an initial length, and an outer rim corresponding to said outer rim portion and defining an initial perimeter of the blank; and
    c) pressing each of said blanks against and along die, thereby forming each of said blanks into a final shape by stretching said outer rim in a direction radially outwardly of said blank such that a final perimeter defined by the outer rim of the final shape is larger than said initial perimeter, stretching said at least one spoke such that a length of the at least one spoke of the final shape is larger than said initial length, and offsetting said central hub in a direction axially of said blank.

* * * * *